(12) United States Patent　(10) Patent No.: US 7,476,108 B2
Swain et al.　(45) Date of Patent: Jan. 13, 2009

(54) ELECTRICAL POWER CONNECTORS WITH COOLING FEATURES

(75) Inventors: Wilfred James Swain, Mechanicsburg, PA (US); Christopher G. Daily, Harrisburg, PA (US); Christopher J. Kolivoski, York, PA (US)

(73) Assignee: FCI Americas Technology, Inc., Carson City, NV (US)

( * ) Notice: Subject to any disclaimer, the term of this patent is extended or adjusted under 35 U.S.C. 154(b) by 0 days.

(21) Appl. No.: 11/255,295

(22) Filed: Oct. 20, 2005

(65) Prior Publication Data

US 2006/0228948 A1　Oct. 12, 2006

Related U.S. Application Data

(60) Provisional application No. 60/638,470, filed on Dec. 22, 2004.

(51) Int. Cl.
*H01R 12/00* (2006.01)

(52) U.S. Cl. .......................... 439/79; 439/947; 439/487

(58) Field of Classification Search .................. 439/70, 439/79, 947, 487, 196, 485, 347; 361/712, 361/703, 704, 730, 705
See application file for complete search history.

(56) References Cited

U.S. PATENT DOCUMENTS

| 318,186 | A | 5/1885 | Hertzog |
| 741,052 | A | 10/1903 | Mahon |
| 1,477,527 | A | 4/1923 | Raettig |
| 2,248,675 | A | 7/1941 | Huppert |
| 2,430,011 | A | 11/1947 | Gillentine ................... 173/361 |
| 2,759,163 | A | 8/1956 | Ustin et al. |
| 2,762,022 | A | 9/1956 | Benander et al. |
| 2,844,644 | A | 7/1958 | Soule, Jr. |
| 3,011,443 | A | 12/1961 | Nielsen |
| 3,178,669 | A | 4/1965 | Roberts |
| 3,208,030 | A | 9/1965 | Evans et al. |
| 3,286,220 | A | 11/1966 | Marley et al. ................ 439/680 |
| 3,411,127 | A | 11/1968 | Adams |
| 3,420,087 | A | 1/1969 | Hatfield |
| 3,514,740 | A | 5/1970 | Filson |
| 3,538,486 | A | 11/1970 | Shlesinger, Jr. ............. 439/268 |
| 3,634,811 | A | 1/1972 | Teagno ........................ 339/47 |

(Continued)

FOREIGN PATENT DOCUMENTS

DE　　1 665 181　　4/1974

(Continued)

OTHER PUBLICATIONS

Finan, J.M., "Thermally Conductive Thermoplastics", LNP Engineering Plastics, Inc., Plastics Engineering 2000, www.4spe.org, 4 pages.

(Continued)

*Primary Examiner*—Tulsidas C. Patel
*Assistant Examiner*—Harshad C Patel
(74) *Attorney, Agent, or Firm*—Woodcock Washburn LLP (57) ABSTRACT

Electrical connectors can include thermally conductive material in regions proximate contacts residing therein to sink heat away from the contacts. The thermally-conductive materials can be provided in the housing structure of the connectors. The thermally-conductive material can also be provided as a thermally-conductive member distinct from the housing.

25 Claims, 10 Drawing Sheets

U.S. PATENT DOCUMENTS

| | | | |
|---|---|---|---|
| 3,669,054 A | 6/1972 | Desso et al. | 113/119 |
| 3,692,994 A | 9/1972 | Hirschman et al. | 362/263 |
| 3,748,633 A | 7/1973 | Lundergan | 339/217 |
| 3,845,451 A * | 10/1974 | Neidecker | |
| 3,871,015 A | 3/1975 | Lin et al. | 357/67 |
| 3,942,856 A | 3/1976 | Mindheim, deceased et al. | 339/74 |
| 3,972,580 A | 8/1976 | Pemberton et al. | 339/47 |
| 4,070,088 A | 1/1978 | Vaden | 339/252 |
| 4,076,362 A | 2/1978 | Ichimura | 339/75 |
| 4,082,407 A * | 4/1978 | Smorzaniuk et al. | 439/487 |
| 4,136,919 A | 1/1979 | Howard et al. | 339/75 |
| 4,159,861 A | 7/1979 | Anhalt | 339/75 |
| 4,217,024 A | 8/1980 | Aldridge et al. | 339/275 |
| 4,260,212 A | 4/1981 | Ritchie et al. | 339/97 |
| 4,288,139 A | 9/1981 | Cobaugh et al. | 339/74 |
| 4,371,912 A | 2/1983 | Guzik | 361/417 |
| 4,383,724 A | 5/1983 | Verhoevan | 439/510 |
| 4,402,563 A | 9/1983 | Sinclair | 339/75 |
| 4,403,821 A | 9/1983 | Zimmerman, Jr. et al. | 339/97 |
| 4,473,113 A * | 9/1984 | Whitfield et al. | 165/185 |
| 4,505,529 A | 3/1985 | Barkus | 439/82 |
| 4,536,955 A | 8/1985 | Gudgeon | 29/840 |
| 4,545,610 A | 10/1985 | Lakritz et al. | 29/589 |
| 4,552,425 A | 11/1985 | Billman | 339/47 |
| 4,560,222 A | 12/1985 | Dambach | 339/75 |
| 4,564,259 A | 1/1986 | Vandame | 339/258 |
| 4,596,433 A | 6/1986 | Oesterheld et al. | 439/206 |
| 4,685,886 A | 8/1987 | Denlinger et al. | 439/55 |
| 4,717,360 A | 1/1988 | Czaja | 439/710 |
| 4,767,344 A | 8/1988 | Noschese | 439/83 |
| 4,776,803 A | 10/1988 | Pretchel et al. | 439/59 |
| 4,782,893 A * | 11/1988 | Thomas | 165/185 |
| 4,815,987 A | 3/1989 | Kawano et al. | 439/263 |
| 4,820,182 A | 4/1989 | Harwath et al. | 439/290 |
| 4,867,713 A | 9/1989 | Ozu et al. | 439/833 |
| 4,878,611 A | 11/1989 | LoVasco et al. | 228/180.2 |
| 4,881,905 A | 11/1989 | Demler, Jr. et al. | 439/79 |
| 4,900,271 A | 2/1990 | Colleran et al. | 439/595 |
| 4,907,990 A | 3/1990 | Bertho et al. | 439/851 |
| 4,963,102 A | 10/1990 | Gettig et al. | 439/291 |
| 4,965,699 A * | 10/1990 | Jorden et al. | 361/706 |
| 4,973,257 A | 11/1990 | Lhotak | 439/81 |
| 4,973,271 A | 11/1990 | Ishizuka et al. | 439/839 |
| 4,974,119 A * | 11/1990 | Martin | 361/720 |
| 4,979,074 A * | 12/1990 | Morley et al. | 361/720 |
| 5,024,610 A | 6/1991 | French et al. | 439/857 |
| 5,035,639 A | 7/1991 | Kilpatrick et al. | 439/290 |
| 5,052,953 A | 10/1991 | Weber | 439/857 |
| 5,066,236 A | 11/1991 | Broeksteeg | 439/79 |
| 5,077,893 A | 1/1992 | Mosquera et al. | 29/882 |
| 5,082,459 A | 1/1992 | Billman et al. | 439/637 |
| 5,094,634 A | 3/1992 | Dixon et al. | 431/751 |
| 5,104,332 A | 4/1992 | McCoy | 439/290 |
| 5,137,959 A * | 8/1992 | Block et al. | 524/430 |
| 5,174,770 A | 12/1992 | Sasaki et al. | 439/108 |
| 5,194,480 A * | 3/1993 | Block et al. | 524/404 |
| 5,213,868 A * | 5/1993 | Liberty et al. | 428/131 |
| 5,214,308 A | 5/1993 | Nishiguchi | 257/692 |
| 5,238,414 A | 8/1993 | Yaegashi et al. | 439/108 |
| 5,254,012 A | 10/1993 | Wang | 439/263 |
| 5,274,918 A | 1/1994 | Reed | 29/882 |
| 5,276,964 A | 1/1994 | Anderson, Jr. et al. | |
| 5,298,791 A * | 3/1994 | Liberty et al. | 257/707 |
| 5,302,135 A | 4/1994 | Lee | 439/263 |
| 5,321,582 A * | 6/1994 | Casperson | 361/713 |
| 5,381,314 A * | 1/1995 | Rudy et al. | 361/712 |
| 5,400,949 A | 3/1995 | Hirvonen et al. | 228/180.22 |
| 5,427,543 A | 6/1995 | Dynia | 439/346 |
| 5,431,578 A | 7/1995 | Wayne | 439/259 |
| 5,457,342 A * | 10/1995 | Herbst, II | 257/712 |
| 5,475,922 A | 12/1995 | Tamura et al. | 29/881 |
| 5,490,040 A | 2/1996 | Gavdenzi et al. | 361/773 |
| 5,533,915 A | 7/1996 | Deans | 439/678 |
| 5,558,542 A | 9/1996 | O'Sullivan et al. | 439/682 |
| 5,558,859 A | 9/1996 | Cretois | 424/70.15 |
| 5,577,928 A | 11/1996 | Duclos | 439/290 |
| 5,582,519 A | 12/1996 | Buchter | |
| 5,590,463 A | 1/1997 | Feldman et al. | 29/844 |
| 5,609,502 A | 3/1997 | Thumma | 439/747 |
| 5,618,187 A * | 4/1997 | Goto | 439/79 |
| 5,637,008 A | 6/1997 | Kozel | 439/342 |
| 5,643,009 A | 7/1997 | Dinkel et al. | |
| 5,664,973 A | 9/1997 | Emmert et al. | 439/862 |
| 5,691,041 A | 11/1997 | Frankeny et al. | 428/209 |
| 5,702,255 A | 12/1997 | Murphy et al. | 439/71 |
| 5,730,609 A | 3/1998 | Harwath | 439/108 |
| 5,741,144 A | 4/1998 | Elco et al. | 439/101 |
| 5,741,161 A | 4/1998 | Cahaly et al. | 439/709 |
| 5,742,484 A | 4/1998 | Gillette et al. | 361/789 |
| 5,743,009 A | 4/1998 | Matsui et al. | 29/843 |
| 5,745,349 A | 4/1998 | Lemke | 361/818 |
| 5,746,608 A | 5/1998 | Taylor | 439/70 |
| 5,755,595 A | 5/1998 | Davis et al. | 439/607 |
| 5,772,451 A | 6/1998 | Dozier et al. | 439/70 |
| 5,787,971 A * | 8/1998 | Dodson | 165/121 |
| 5,795,191 A | 8/1998 | Preputnick et al. | 439/608 |
| 5,810,607 A | 9/1998 | Shih et al. | 439/66 |
| 5,817,973 A | 10/1998 | Elco et al. | 174/32 |
| 5,857,857 A | 1/1999 | Fukuda | 439/188 |
| 5,874,776 A | 2/1999 | Kresge et al. | 257/747 |
| 5,876,219 A | 3/1999 | Taylor et al. | 439/74 |
| 5,876,248 A | 3/1999 | Brunker et al. | |
| 5,883,782 A | 3/1999 | Thurston et al. | 364/704 |
| 5,888,884 A | 3/1999 | Wojnarowski | 438/462 |
| 5,908,333 A | 6/1999 | Perino et al. | 439/631 |
| 5,919,050 A | 7/1999 | Kehley et al. | 439/71 |
| 5,930,114 A | 7/1999 | Kuzmin et al. | 361/704 |
| 5,955,888 A | 9/1999 | Frederickson et al. | 324/761 |
| 5,961,355 A | 10/1999 | Morlion et al. | 439/686 |
| 5,971,817 A | 10/1999 | Longueville | 439/857 |
| 5,975,921 A | 11/1999 | Shuey | 439/83 |
| 5,980,270 A | 11/1999 | Fjelstad et al. | 439/71 |
| 5,980,321 A | 11/1999 | Cohen et al. | 439/608 |
| 5,984,726 A | 11/1999 | Wu | 439/607 |
| 5,993,259 A | 11/1999 | Stokoe et al. | 439/608 |
| 6,012,948 A | 1/2000 | Wu | 439/567 |
| 6,050,862 A | 4/2000 | Ishii | 439/843 |
| 6,059,170 A | 5/2000 | Jimarez et al. | 228/119 |
| 6,068,520 A | 5/2000 | Winings et al. | 439/676 |
| 6,071,152 A | 6/2000 | Achammer et al. | 439/733.1 |
| 6,077,130 A | 6/2000 | Hughes et al. | 439/862 |
| 6,089,878 A | 7/2000 | Meng | 439/79 |
| 6,095,827 A | 8/2000 | Dutkowsky et al. | 439/83 |
| 6,123,554 A | 9/2000 | Ortega et al. | 439/79 |
| 6,125,535 A | 10/2000 | Chiou et al. | 29/883 |
| 6,139,336 A | 10/2000 | Olson | 439/83 |
| 6,146,157 A | 11/2000 | Lenoir et al. | 439/101 |
| 6,146,202 A | 11/2000 | Ramey et al. | |
| 6,146,203 A | 11/2000 | Elco et al. | 439/608 |
| 6,152,756 A | 11/2000 | Huang et al. | 439/342 |
| 6,174,198 B1 | 1/2001 | Wu et al. | 439/541.5 |
| 6,180,891 B1 | 1/2001 | Murdeshwar | 174/260 |
| 6,183,287 B1 | 2/2001 | Po | |
| 6,183,301 B1 | 2/2001 | Paagman | 439/608 |
| 6,190,213 B1 | 2/2001 | Reichart et al. | 439/736 |
| 6,193,537 B1 | 2/2001 | Harper, Jr. et al. | 439/291 |
| 6,196,871 B1 | 3/2001 | Szu | 439/571 |
| 6,202,916 B1 | 3/2001 | Updike et al. | 228/180 |
| 6,210,197 B1 | 4/2001 | Yu | 439/342 |
| 6,210,240 B1 | 4/2001 | Comerci et al. | 439/853 |
| 6,212,755 B1 | 4/2001 | Shimada et al. | 29/527.1 |
| 6,215,180 B1 | 4/2001 | Chen et al. | 257/720 |
| 6,219,913 B1 | 4/2001 | Uchiyama | 29/883 |

| | | |
|---|---|---|
| 6,220,884 B1 | 4/2001 | Lin .................................. 439/342 |
| 6,220,895 B1 | 4/2001 | Lin .................................. 439/607 |
| 6,220,896 B1 | 4/2001 | Bertoncini et al. ............. 439/608 |
| 6,234,851 B1 | 5/2001 | Phillips ........................ 439/825 |
| 6,257,478 B1 | 7/2001 | Straub ........................... 228/6.2 |
| 6,259,039 B1 | 7/2001 | Chroneos, Jr. et al. ........ 174/263 |
| 6,269,539 B1 | 8/2001 | Takahashi et al. ............. 29/883 |
| 6,272,474 B1 | 8/2001 | Garcia ........................... 438/613 |
| 6,293,827 B1 | 9/2001 | Stokoe et al. ................... 439/608 |
| 6,299,492 B1 | 10/2001 | Pierini et al. ................... 439/884 |
| 6,309,245 B1 * | 10/2001 | Sweeney ........................ 439/507 |
| 6,319,075 B1 * | 11/2001 | Clark et al. .................... 439/825 |
| 6,328,602 B1 | 12/2001 | Yamasaki et al. ............... 439/608 |
| 6,347,952 B1 | 2/2002 | Hasegawa et al. .............. 439/608 |
| 6,350,134 B1 | 2/2002 | Fogg et al. ..................... 439/79 |
| 6,359,783 B1 * | 3/2002 | Noble ............................. 361/704 |
| 6,360,940 B1 | 3/2002 | Bolde et al. .................... 228/264 |
| 6,362,961 B1 * | 3/2002 | Chiou ............................. 361/704 |
| 6,363,607 B1 | 4/2002 | Chen et al. ..................... 29/883 |
| 6,371,773 B1 | 4/2002 | Crofoot et al. ................. 439/79 |
| 6,379,188 B1 | 4/2002 | Cohen et al. ................... 439/608 |
| 6,386,924 B2 | 5/2002 | Long ............................. 439/701 |
| 6,409,543 B1 * | 6/2002 | Astbury et al. ................ 439/608 |
| 6,428,328 B2 | 8/2002 | Haba et al. ..................... 439/70 |
| 6,431,914 B1 | 8/2002 | Billman ......................... 439/608 |
| 6,435,914 B1 | 8/2002 | Billman ......................... 439/608 |
| 6,461,202 B2 | 10/2002 | Kline ............................. 439/701 |
| 6,471,523 B1 | 10/2002 | Shuey ............................ 439/63 |
| 6,471,548 B2 | 10/2002 | Bertoncini et al. ............. 439/608 |
| 6,506,081 B2 | 1/2003 | Blanchfield et al. ............ 439/682 |
| 6,514,103 B2 | 2/2003 | Pape et al. ..................... 439/608 |
| 6,537,111 B2 | 3/2003 | Brammer et al. .............. 439/857 |
| 6,544,046 B1 | 4/2003 | Hahn et al. ..................... 439/83 |
| 6,551,112 B1 | 4/2003 | Li et al. ......................... 439/66 |
| 6,554,046 B1 | 4/2003 | Bryan et al. ................... 156/584 |
| 6,554,647 B1 | 4/2003 | Cohen et al. ................... 439/607 |
| 6,572,410 B1 | 6/2003 | Volstorf et al. ................ 439/608 |
| 6,592,381 B2 | 7/2003 | Cohen et al. ................... 439/80 |
| 6,652,318 B1 | 11/2003 | Winings et al. ................ 439/608 |
| 6,663,426 B2 | 12/2003 | Fedder et al. .................. 439/608 |
| 6,665,189 B1 * | 12/2003 | Lebo .............................. 361/730 |
| 6,669,514 B2 | 12/2003 | Wiebking et al. ............. 439/701 |
| 6,672,907 B2 | 1/2004 | Azuma ........................... 439/682 |
| 6,692,272 B2 | 2/2004 | Lemke et al. .................. 439/108 |
| 6,702,594 B2 | 3/2004 | Lee et al. ........................ 439/83 |
| 6,705,902 B1 | 3/2004 | Yi et al. ......................... 439/678 |
| 6,712,621 B2 | 3/2004 | Li et al. ......................... 439/65 |
| 6,716,068 B2 | 4/2004 | Wu ............................... 439/733.1 |
| 6,740,820 B2 | 5/2004 | Cheng ........................... 174/260 |
| 6,743,037 B2 | 6/2004 | Kassa et al. .................... 439/342 |
| 6,746,278 B2 | 6/2004 | Nelson et al. .................. 439/608 |
| 6,769,883 B2 | 8/2004 | Brid et al. |
| 6,769,935 B2 | 8/2004 | Stokoe et al. .................. 439/608 |
| 6,776,635 B2 | 8/2004 | Blanchfield et al. ........... 439/181 |
| 6,776,649 B2 | 8/2004 | Pape et al. ..................... 439/485 |
| 6,790,088 B2 | 9/2004 | Ono et al. ...................... 439/607 |
| 6,796,831 B1 | 9/2004 | Yasufuku et al. .............. 439/485 |
| 6,811,440 B1 | 11/2004 | Rothermel et al. ............ 439/608 |
| 6,829,143 B2 * | 12/2004 | Russell et al. ................. 361/704 |
| 6,835,103 B2 | 12/2004 | Middlehurst et al. ......... 439/699.1 |
| 6,843,687 B2 | 1/2005 | McGowan et al. ............ 439/608 |
| 6,848,886 B2 | 2/2005 | Schmaling et al. ............ 416/134 |
| 6,848,950 B2 | 2/2005 | Allison et al. ................. 439/682 |
| 6,848,953 B2 | 2/2005 | Schell et al. |
| 6,869,294 B2 | 3/2005 | Clark et al. .................... 439/79 |
| 6,884,117 B2 | 4/2005 | Korsunsky et al. ............ 439/607 |
| 6,890,221 B2 * | 5/2005 | Wagner ......................... 439/855 |
| 6,905,367 B2 | 6/2005 | Crane, Jr. et al. .............. 439/608 |
| 6,929,504 B2 | 8/2005 | Ling et al. ..................... 439/485 |
| 6,947,012 B2 * | 9/2005 | Aisenbrey ..................... 343/906 |
| 6,975,511 B1 * | 12/2005 | Lebo et al. ..................... 361/703 |
| 6,994,569 B2 | 2/2006 | Minich et al. .................. 439/79 |
| 7,001,189 B1 | 2/2006 | McGowan et al. ............ 439/79 |
| 7,070,464 B2 | 7/2006 | Clark et al. .................... 439/825 |
| 7,074,096 B2 | 7/2006 | Copper et al. .................. 439/843 |
| 7,101,228 B2 | 9/2006 | Hamner et al. ................ 439/637 |
| 7,104,812 B1 | 9/2006 | Bogiel et al. .................. 439/79 |
| 7,114,963 B2 | 10/2006 | Shuey et al. ................... 439/79 |
| 7,168,963 B2 | 1/2007 | Minich et al. .................. 439/79 |
| 7,182,642 B2 * | 2/2007 | Ngo et al. ...................... 439/608 |
| D542,736 S | 5/2007 | Riku ............................... D13/147 |
| 7,273,382 B2 | 9/2007 | Igarashi et al. |
| 7,335,043 B2 * | 2/2008 | Ngo et al. ...................... 439/290 |
| 2001/0003685 A1 * | 6/2001 | Aritani .......................... 439/485 |
| 2002/0106930 A1 | 8/2002 | Pape et al. ..................... 439/485 |
| 2002/0142676 A1 | 10/2002 | Hosaka et al. ................. 439/874 |
| 2002/0159235 A1 | 10/2002 | Miller et al. ................... 361/704 |
| 2002/0193019 A1 | 12/2002 | Blanchfield et al. ........... 439/857 |
| 2003/0013330 A1 | 1/2003 | Takeuchi ....................... 439/83 |
| 2003/0143894 A1 | 7/2003 | Kline et al. .................... 439/608 |
| 2003/0219999 A1 | 11/2003 | Minich et al. .................. 439/79 |
| 2003/0220021 A1 | 11/2003 | Whiteman, Jr. et al. ...... 439/608 |
| 2003/0236035 A1 | 12/2003 | Kuroda et al. ................. 439/857 |
| 2004/0183094 A1 | 9/2004 | Caletka et al. ................. 257/178 |
| 2005/0112952 A1 | 5/2005 | Wang et al. .................... 439/660 |
| 2006/0003620 A1 * | 1/2006 | Daily et al. .................... 439/295 |
| 2006/0281354 A1 | 12/2006 | Ngo et al. ...................... 439/290 |

FOREIGN PATENT DOCUMENTS

| | | |
|---|---|---|
| DE | 102 26 279 C1 | 11/2003 |
| EP | 0 273 683 A2 | 7/1988 |
| EP | 0 321 257 B1 | 4/1993 |
| EP | 0 623 248 B1 | 11/1995 |
| EP | 0 789 422 A2 | 8/1997 |
| EP | 1 091 449 B1 | 9/2004 |
| GB | 1 162 705 | 8/1969 |
| JP | 06-236788 | 8/1994 |
| JP | 07-114958 | 5/1995 |
| JP | 0 812 5379 | 5/1996 |
| JP | 2000-003743 | 1/2000 |
| JP | 2000-003744 | 1/2000 |
| JP | 2000-003745 | 1/2000 |
| JP | 2000-003746 | 1/2000 |
| JP | 2003-217785 | 7/2003 |
| TW | 546 872 | 8/2003 |
| TW | 576 555 | 2/2004 |
| WO | WO 97/43885 | 11/1997 |
| WO | WO 97/44859 | 11/1997 |
| WO | WO 98/15989 | 4/1998 |
| WO | WO 01/29931 A1 | 4/2001 |
| WO | WO 01/39332 A1 | 5/2001 |

OTHER PUBLICATIONS

Sherman, L.M., "Plastics that Conduct Heat", Plastics Technology Online, Jun. 2001, http://www.plasticstechnology.com, 4 pages.

Ogando, J., "And now-An Injection-Molded Heat Exchanger", Sure, plastics are thermal insulators, but additive packages allow them to conduct heat instead, Global Design News, Nov. 1, 2000, 4 pages.

In the United States Patent and Trademark Office:. Office Action Summary of U.S. Appl. No. 11/284,154, Dated Apr. 20, 2007, 10 pages.

In the United States Patent and Trademark Office:. Office Action Summary of U.S. Appl. No. 11/284,154, Dated Jan. 4, 2007, 12 pages.

In the United States Patent and Trademark Office:. Office Action Summary of U.S. Appl. No. 11/284,154, Dated Jul. 6, 2006, 27 pages.

In the United States Patent and Trademark Office:. Office Action Summary of U.S. Appl. No. 11/284,154, Dated Oct. 9, 2007 11 pages.

* cited by examiner

ELECTRICAL POWER CONNECTORS WITH COOLING FEATURES

CROSS-REFERENCE TO RELATED APPLICATIONS

This application claims priority under 35 U.S.C. § 119(e) to U.S. provisional application No. 60/638,470, filed Dec. 22, 2004, the contents of which is incorporated by reference herein in its entirety. This application is related to U.S. provisional application No. 60/648,561, filed Jan. 31, 2005, and U.S. provisional application No. 60/668,350, filed Apr. 5, 2005. The contents of each of these applications is incorporated by reference herein in its entirety.

FIELD OF THE INVENTION

The present invention relates to electrical connectors that include power contacts and thermally conductive structural elements in close proximity with the power contacts for sinking heat away from the contacts.

BACKGROUND OF THE INVENTION

Power connectors, by their functional nature, produce heat. Typical materials used in most existing connector housing designs are thermally insulative, and thus, hold in heat, allowing it to build up inside the connector. One approach for improving heat dissipation has been to core out the housing as much as possible to allow clearance around the contacts within the housing in hopes of improving convective heat transfer. However, stagnant air is a poor conductor of heat, and localized forced air is dependent on a customer's application.

SUMMARY OF ILLUSTRATIVE EMBODIMENTS

The invention includes both plug and receptacle power connectors. In some of the embodiments, the housing of at least one of the plug and receptacle connectors includes thermally conductive material in regions proximate contacts residing therein to sink heat away from the contacts. Both mating connectors can employ thermally conductive materials in their housing structure. The connector housing may also include materials other than the thermally conductive material. Furthermore, the thermally conductive material may reside generally throughout the housing structure. Alternatively, the thermally-conductive material may be selectively placed at locations such as locations proximate the heat generating contacts.

One manner of providing thermally conductive material proximate the power contacts is by forming the housing structure out of such material; for example, injection moldable thermoplastic materials including additives or fillers that render the cured polymer thermally conductive. Another manner includes employing a separately formed heat dissipation member that can be coupled to either the housing structure surrounding the power contacts or to the contacts themselves. For example, a clip, made out of thermally conductive material, can be added to a power contact, and the contact be inserted into the housing. At least a portion of the clip is preferably exposed to the exterior of the connector housing, so that heat conductively transferred from the contact can subsequently be transferred away from the entire connector via convection. The connector housing may be made from thermally insulative or conductive materials in embodiments where a separately formed heat dissipation member is coupled to housing structure or the power contact.

In preferred embodiments of the present invention, power contacts including plate-like body members are employed. The relatively large surface area of these contacts help facilitate heat transfer to the surrounding thermally conductive housing material. Other power contact designs can equally be employed without limitation. Moreover, the principles of the present invention can be applied to both single and multiple-contact connectors.

DETAILED DESCRIPTION OF ILLUSTRATIVE EMBODIMENTS

Figure 1:
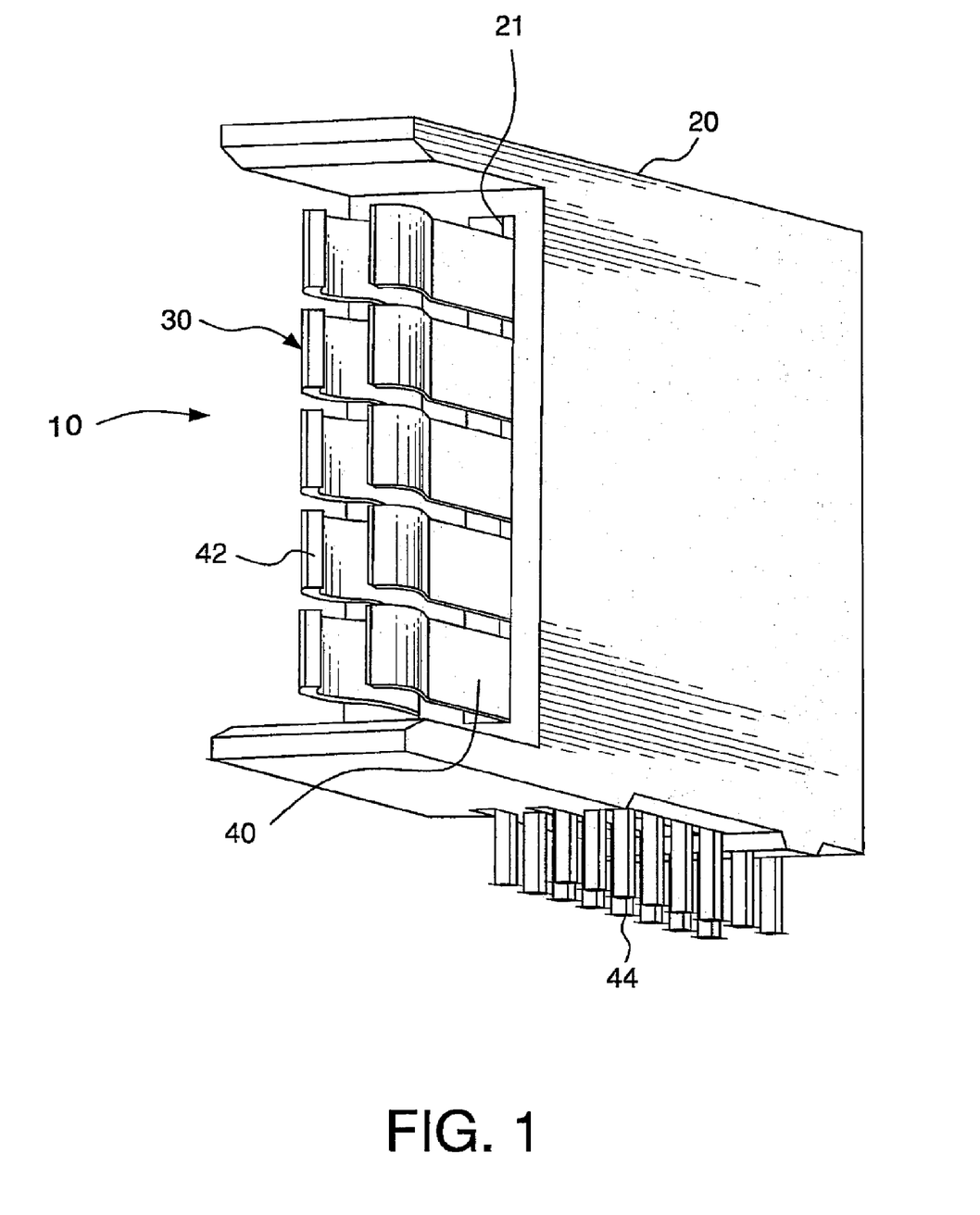
FIG. 1 is a front perspective view of an exemplary plug connector in accordance with the present invention.
Figure 2:
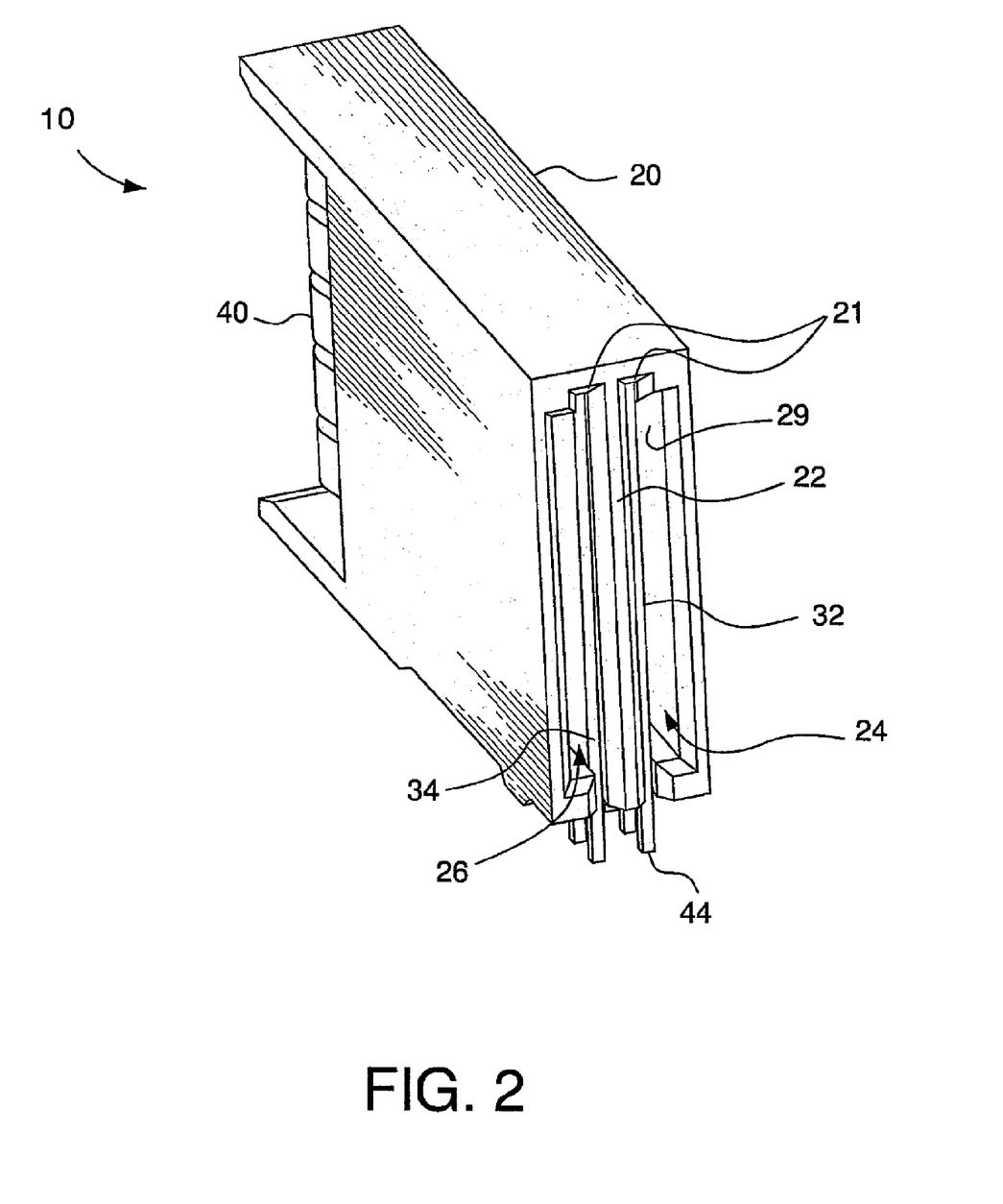
FIG. 2 is a rear perspective view of the plug connector shown in FIG. 1.
Figure 3:
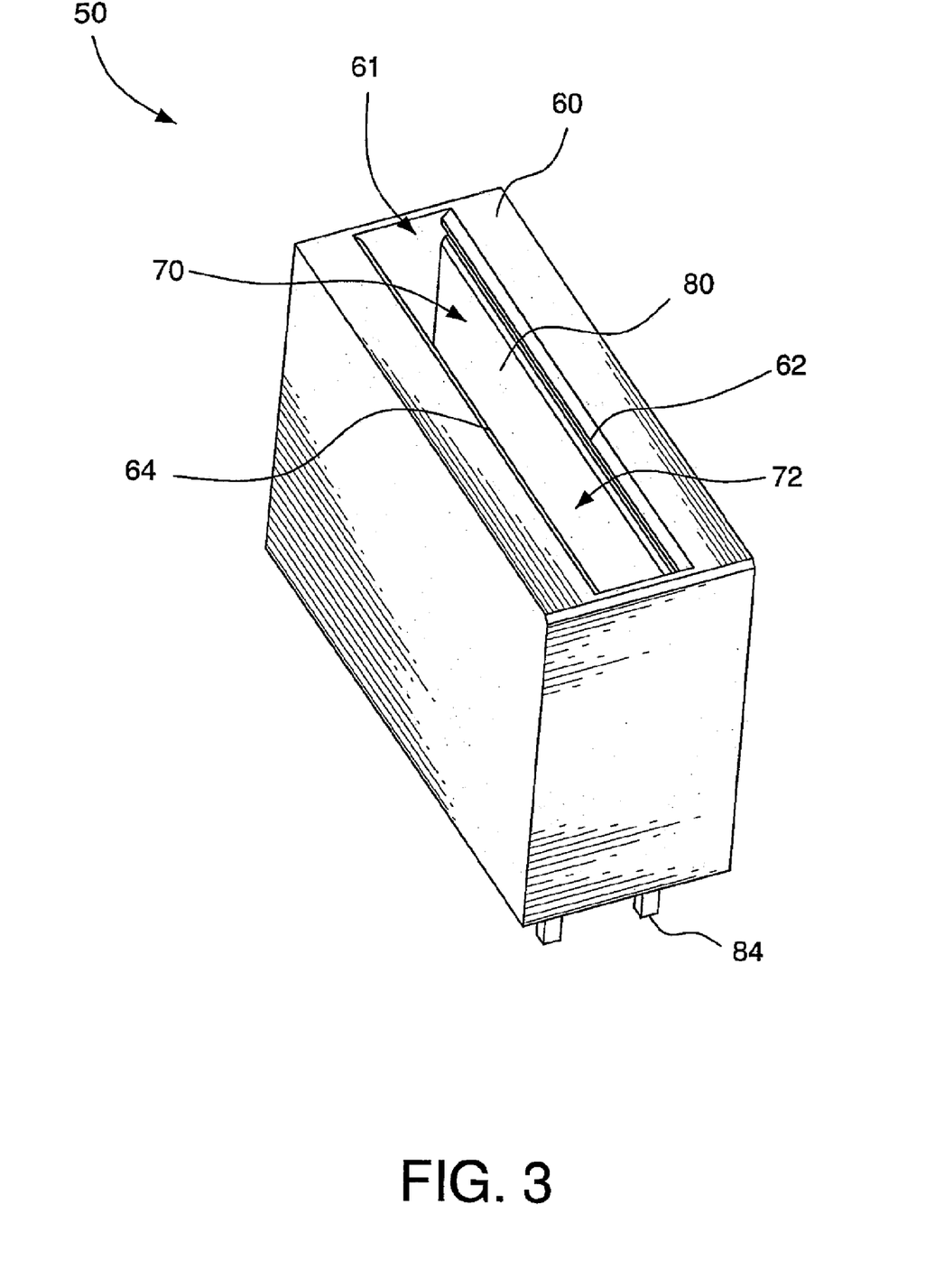
FIG. 3 is a perspective view of an exemplary receptacle connector provided by the present invention.

Reference is made to FIGS. 1-3 wherein like features are labeled with like reference characters. An exemplary power plug connector 10 is shown in FIGS. 1 and 2, including a housing 20, a contact pocket 21, and a plug contact 30 disposed substantially in pocket 21. Plug contact 30 is defined by a pair of plate-like body members 32 and 34. As shown, plate-like body members 32 and 34 are not connected to each other; however, alternative embodiments may include a connecting member. A plurality of beams 40 extend from a front edge of each of body members 32 and 34 for engaging a receptacle contact. Beams 40 have a bulb-shaped distal end 42 that define the primary engagement area of the plug contact with a corresponding receptacle contact. Extending from a bottom edge of each of plate-like body members 32 and 34 is a plurality of terminals 44 for engaging a printed circuit board. Contacts having configurations different than that shown can also be used in accordance with the present invention.

Respective inner surfaces of plate-like body members 32 and 34 are positioned flush against a wall 22 of pocket 21 that preferably includes thermally conductive material, so that heat can be transferred away from the contact itself. In preferred embodiments, the thermally conductive material includes a thermally conductive thermoplastic. Such thermoplastics are currently available from PolyOne Corp., Cool Polymers, LNP Engineering Plastics, TRP Co., and Ticona Corp. Although most thermoplastics, particularly those traditionally used in the electronics industry, are good insulators, fillers or additives can be compounded with existing base polymers (e.g., nylons, liquid crystal polymers, and polyesters) to impart thermal conductivity. Among the most commonly used heat-conductive additives are graphite carbon fibers; carbon powder; metallic fillers such as copper powder, steel, aluminum power, and aluminum flake; and ceramic fillers such as aluminum nitride and boron nitride. Thermally conductive polymers can be produced in either electrically or non-electrically conductive grades, either of which may be used in a connector application of the present invention.

The thermally conductive material can have a thermal conductivity of approximately 1.2 W/m K to approximately 2.4 W/m K, and a heat capacity of approximately 1.1 J/g K to approximately 1.3 J/g K. These particular ranges of thermal conductivity and heat capacity are disclosed for exemplary purposes only. Thermally conductive materials having thermal conductivities or heat capacities outside of these ranges can be used in the alternative.

Respective outer surfaces of plate-like body members 32 and 34 are exposed to housing channels 24 and 26. These channels can improve heat dissipation from plug contact 30 via convection. Thus, heat generated by contact 30 can be transferred away from the contact both conductively via thermally conductive wall 22 and convectively via air flow through channels 24 and 26. Besides wall 22, other portions of plug connector housing 20 can employ thermally conductive material. For example, plug connector housing 20 can be injection molded from thermally conductive polymers so that the entire structure is available as a heat sink. In this scenario, radiative heat transfer can also occur from the outer surfaces of plate-like body members 32 and 34 to opposing pocket walls 28 (not visible) and 29.

Referring now to FIG. 3, an exemplary receptacle connector 50 is shown, including a housing 60, a contact pocket 61, and a receptacle contact 70 disposed in pocket 61. Receptacle contact 70 has a pair of spaced apart plate-like body members 80 and 82 (not visible). As shown, plate-like body members 80 and 82 are not connected to each other; however, alternative embodiments may include a connecting member. A plug contact receiving space 72 is interposed between body members 80 and 82, and a plurality of terminals 84 extends from each of the body members 80 and 82. Connector housing 60 is preferably made from thermally conductive polymers to facilitate heat transfer from contact 70 to surrounding housing structure; e.g., contact pocket walls 62 and 64. Plug contact receiving space 72 may also facilitate heat transfer through convective air flow though housing 60.

Figure 4:
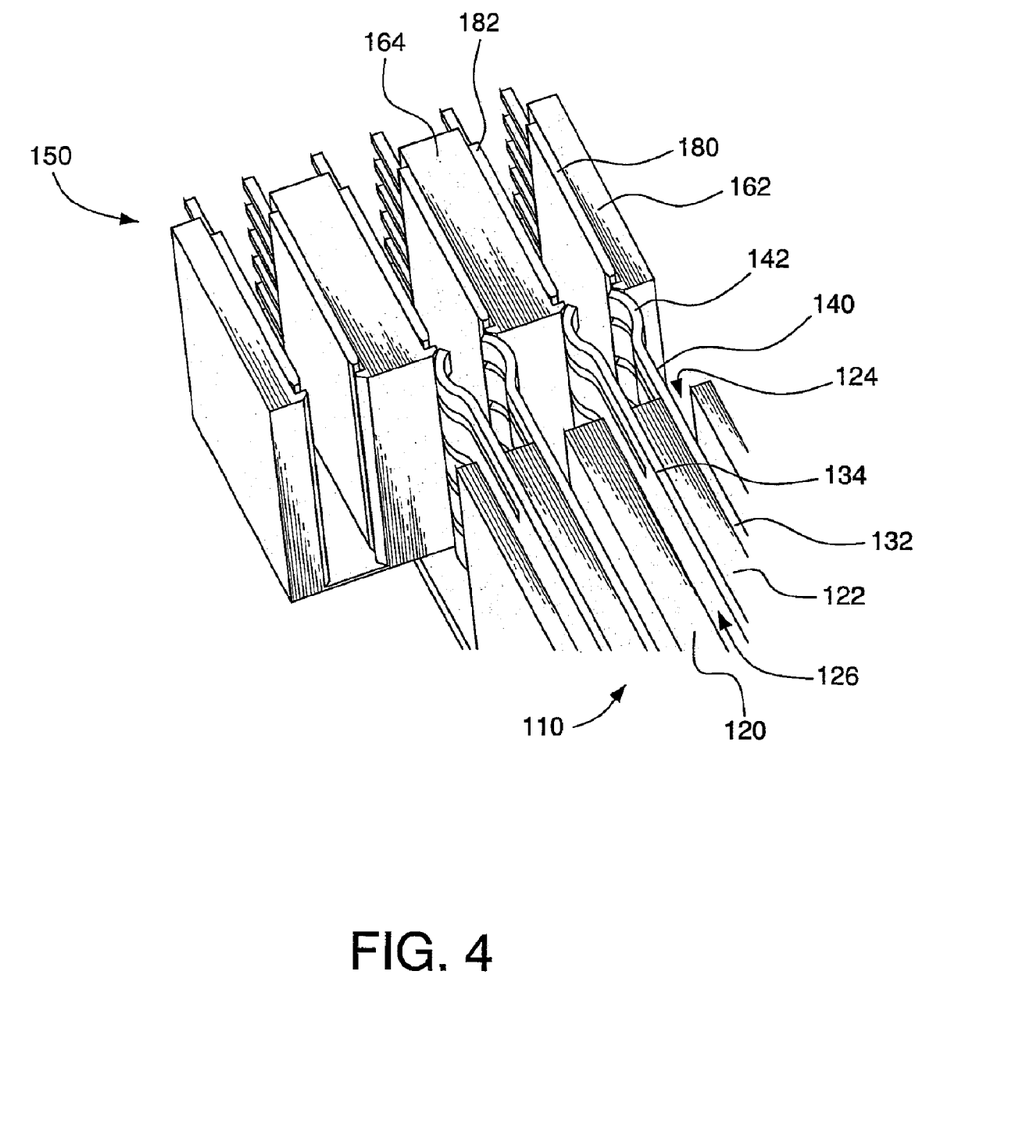
FIG. 4 is a partial perspective view of one preferred plug connector being mated with one preferred receptacle connector.

Referring now to FIG. 4, an exemplary plug connector 110 is shown being mated with an exemplary receptacle connector 150. Features of connectors 110 and 150 are labeled with reference numbers corresponding to those directed to similar features in connectors 10 and 50, but in the hundred series. When connectors 110 and 150 are mated, the bulb-shaped distal end 142 of beams 140 resiliently deflect inwardly, creating normal forces. These normal forces help to ensure intimate contact between the contact plate-like body members and adjacent housing material that preferably includes thermally conductive material. This intimate contact enhances heat transfer from the contacts. The normal forces urge inner surfaces of body members 132 and 134 against wall 122, and outer surfaces of body members 180 and 182 against walls 162 and 164. Much of the heat is locally generated at the mating interface between the beams' distal ends 142 and inner surface regions of plate-like body members 180 and 182. Heat dissipation is improved by employing thermally conductive material directly behind the interface.

In alternative connector embodiments of the present invention, additional thermally conductive material can be disposed between contact features and connector housing features, which also comprise thermally conductive material. For example, a conductive pad or compound can be disposed in gaps between contact body members and surrounding housing structure. In some instances, such additional thermally conductive material is included to fill any small air gaps (which would be insulative) arising from high points on the adjacent contact and/or housing structures. Here, there would be some portions of the contact body member that are in intimate contact surrounding housing structure and some portions that are coupled (conductively) via the additional conductive material. In other instances, no portions of the contact will be in direct contact with surrounding housing structure, and the gap would be at least partially filled with an added conductive pad or compound for example.

Figure 5:
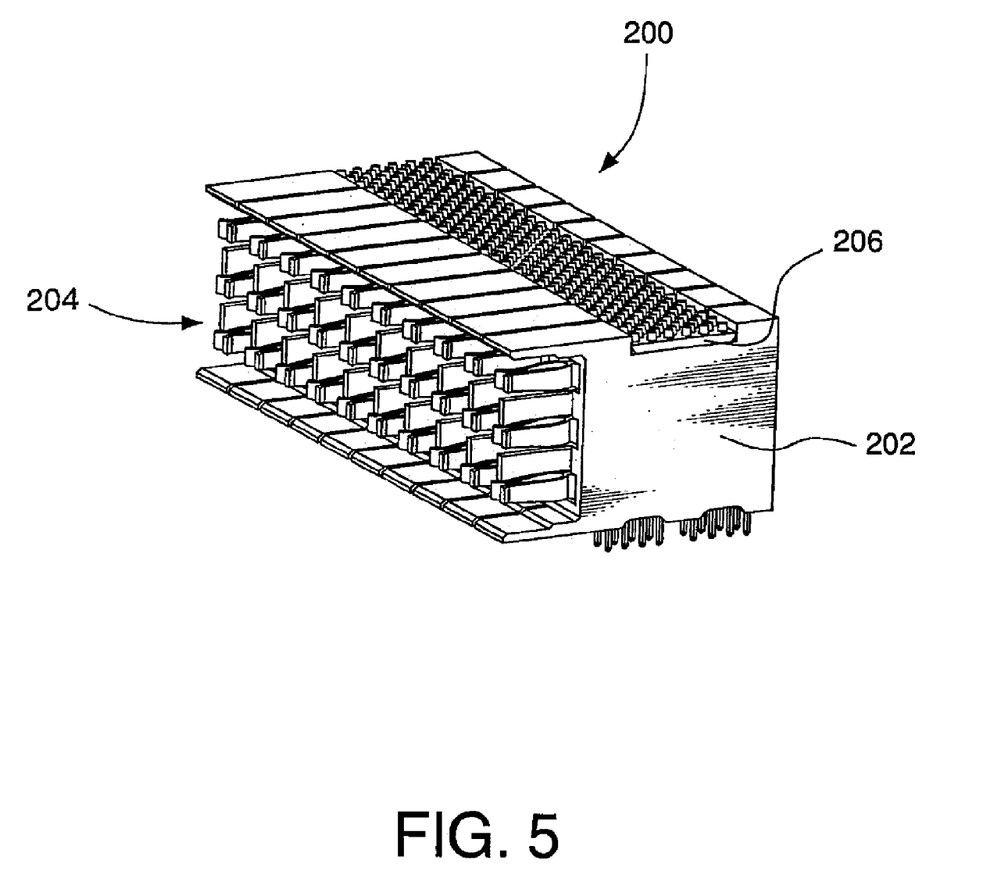
FIG. 5 is a front perspective view of another exemplary electrical connector provided by the present invention.
Figure 6:
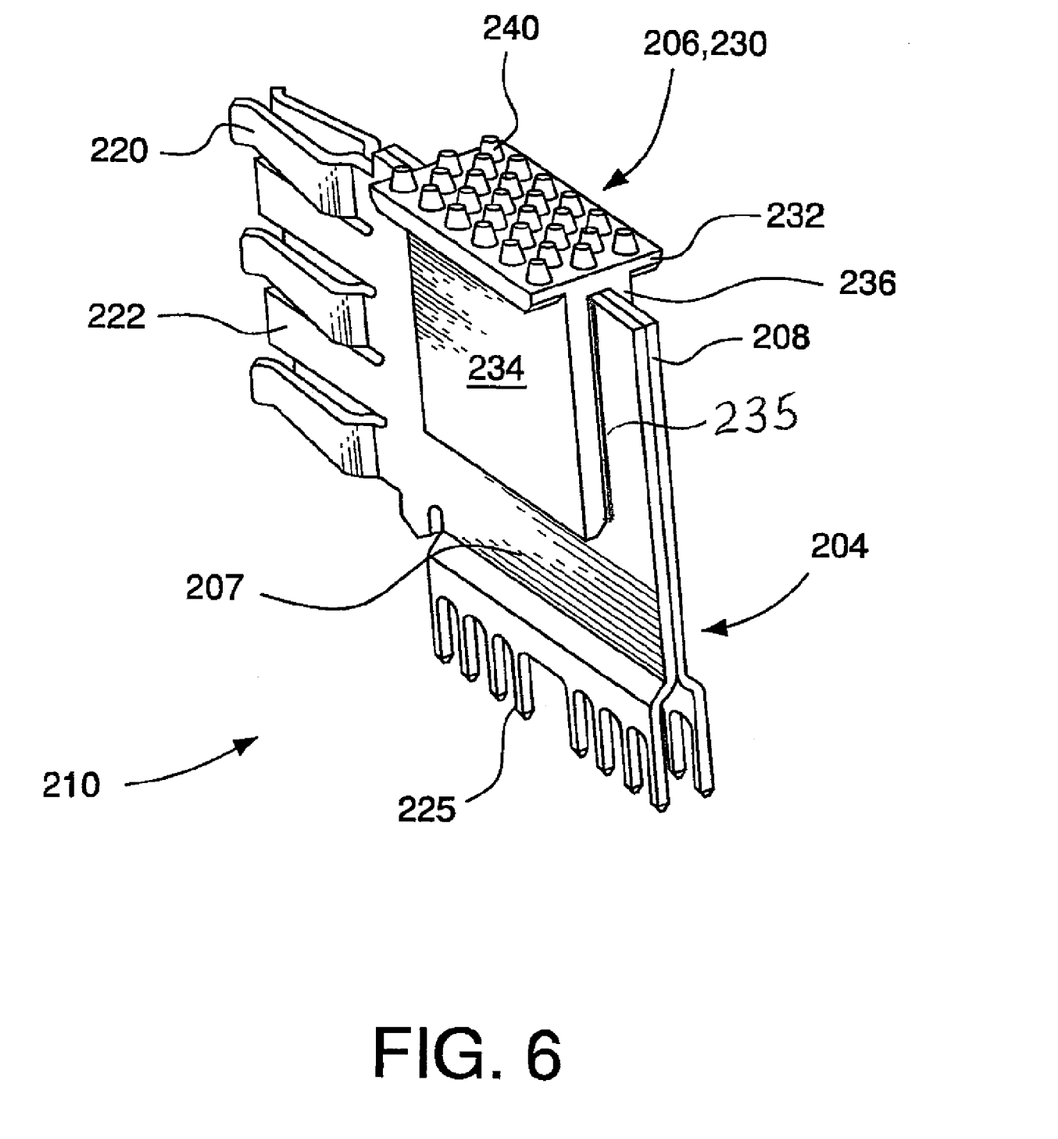
FIG. 6 is a rear perspective view of a preferred power contact and heat dissipation member subassembly.

Referring now to FIG. 5, another exemplary connector 200 is shown, including a housing 202, a plurality of power contacts 204, and a heat dissipation member 206. Housing 202 may be made from thermally insulative or thermally conductive materials. A subassembly 210 of power contact 204 and heat dissipation member 206 is illustrated in FIG. 6. Power contact 204 includes first and second plate-like body members 207 and 208 that are shown being stacked against each other whereby at least a portion of their inner surfaces are preferably touching (note that some portions of the opposing inner surfaces may be spaced apart due to purposeful design consideration and/or manufacturability). Each of body members 207 and 208 comprises a series of angled cantilevered beams 220 and a series of straight cantilevered beams 222 arranged in an alternating manner. Opposing angled beams 220 define "pinching" or "receptacle" beams that are capable of engaging one or more straight beams of a contact associated with a mating electrical connector. Contacts having a different number of beams, and/or different beam geometries, are equally contemplated by the present invention. Each of body members 207 and 208 further comprises a plurality of terminals 225 for engaging a printed circuit structure. Terminals 225 can be configured for either a press-fit or soldered engagement, or any other engagement readily known to the skilled artisan.

Figure 7:
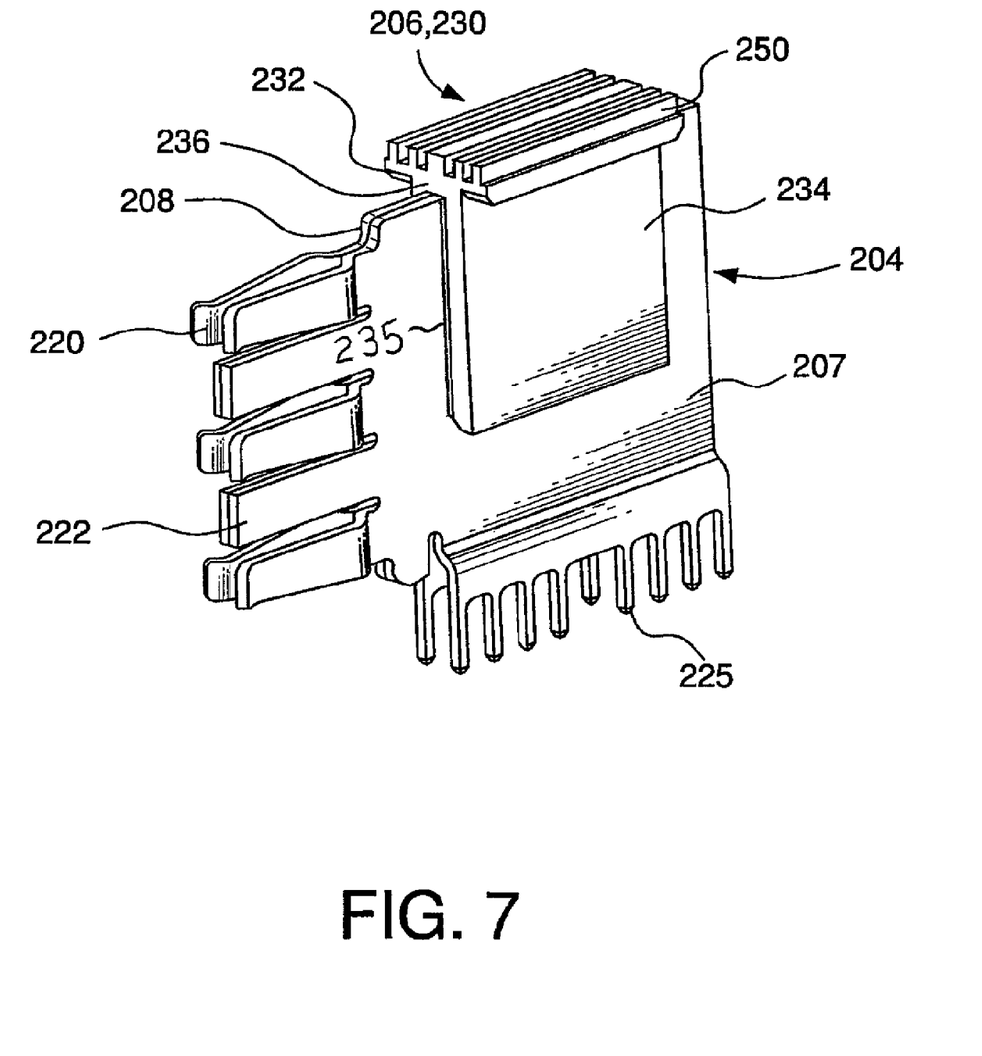
FIG. 7 is a front perspective view of another preferred power contact and heat dissipation member subassembly.

Heat dissipation member 206 can have many different forms, including a clip 230, as is shown in FIGS. 6 and 7. Clip 230 is constructed out of thermally conductive material, such as, for example, metal or the modified thermoplastics described above, to sink heat away from power contact 204 through conduction. Clip 230 includes a top portion 232 and a pair of panels 234 and 236 that extend downwardly from top portion 232. As shown, contact body members 207 and 208 are stacked against each other, so that panel 234 engages an outer portion of body member 207 while panel 236 engages an outer portion of body member 208. A thermally conductive gasket or compound 235 may optionally be employed in between the panels and contact body members to ensure good conductivity. Top portion 232 can optionally employ heat transfer enhancing features, such as, for example, a plurality of studs 240 or fins 250 (shown in FIG. 7). Although not shown, contact body members 207 and 208 may be spaced apart, wherein one or more clip panels are placed in a medial space defined between the body members to engage respective inner portions of the body members. Additional clip panels may further engage respective outer portions of the spaced apart body members.

The use of the term "clip" is in no way intended to limit the design of the heat dissipation member 206. Rather, the important aspects of the heat dissipation member is that it be designed and positioned in such a way to sink heat away from the power contact. In preferred embodiments, at least a portion of the heat dissipation member is exposed to the outside environment so as to create a heat transfer pathway from a connector interior to the connector exterior. As can be seen in FIG. 5, which represents only one preferred configuration, the area of the heat dissipation member 206 that is open exposed to the outside environment is perpendicular to the portion (downwardly extending panels) that is inserted into the connector, thereby increasing the surface area exposed to the outside environment, and thus, the amount of thermal convection to the cooler outside environment. The portion of the heat dissipation member within the connector housing (panels 234, 236) is oriented parallel, and in intimate contact with the body members of the power contact. The panels transfer heat to the perpendicular portion exposed to the outside environment by means of conduction, while the perpendicular portion then transfers that heat to the environment by means of convection. Note that although it is preferred for at least a portion of the thermally conductive heat dissipation member be exposed to the outside environment, the heat dissipation member may be completely contained within a connector housing in alternate embodiments.

Figure 8:
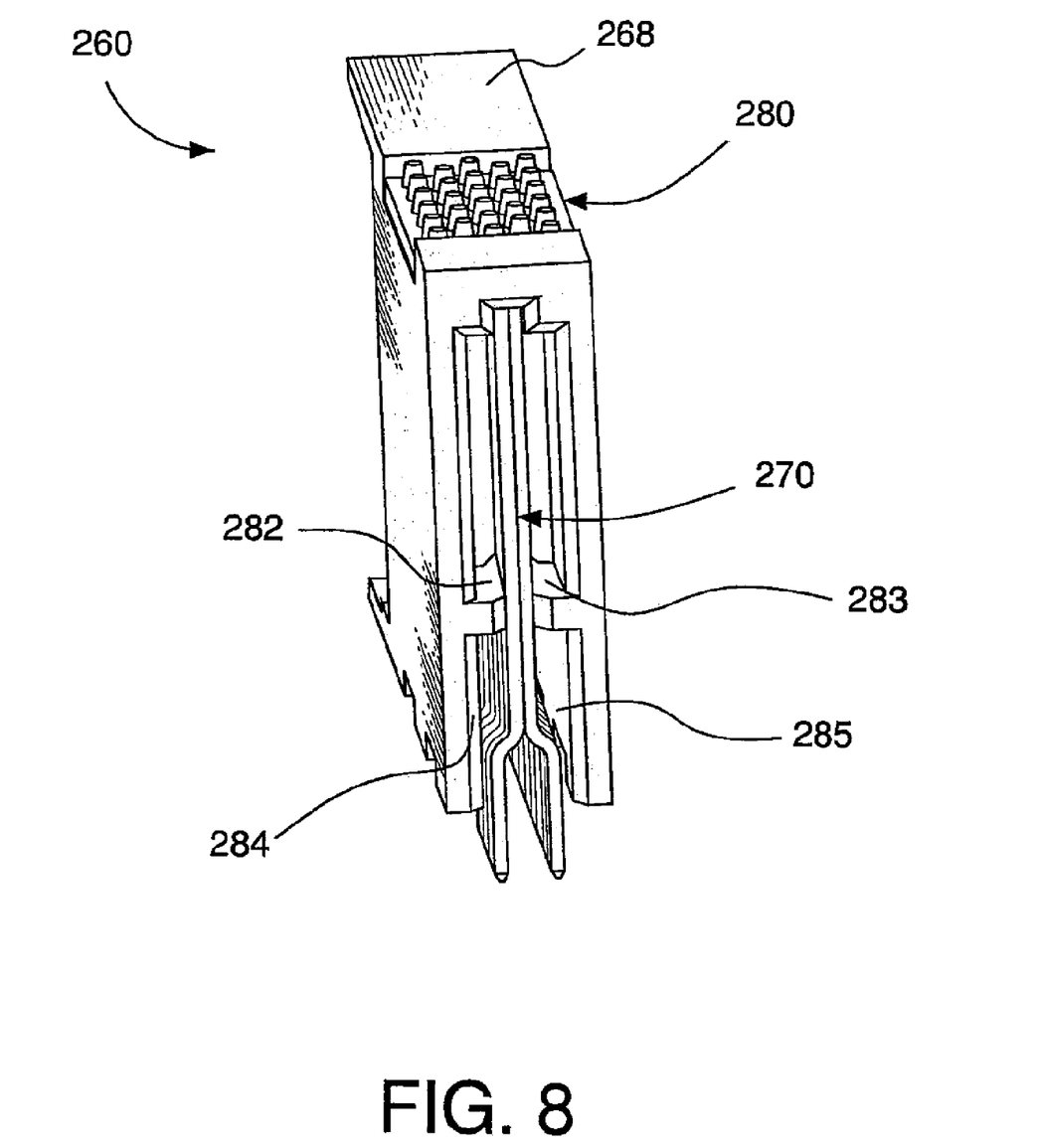
FIG. 8 is rear view of an exemplary electrical connector including a heat dissipation member and multiple heat transfer pathways.

A rear portion of an electrical connector 260, similar to connector 200, is shown in FIG. 8. Connector 260 includes a housing 268, a power contact 270, and a heat dissipation member 280. The features of power contact 270 and heat dissipation member 280 are similar to those shown in FIGS. 6 and 7. Housing 268 has four channels 282, 283, 284 and 285 that may facilitate heat transfer away from power contact 270 via convection. Heat can be transferred directly away from power contact 270 by convective means with air flow through channels 284 and 285. Heat can also be transferred indirectly away from power contact 270 by convective means with heat first being transferred from power contact 270 to heat dissipation member 280 through conductive means. Housing 268 may be made out of either thermally insulative or thermally conductive materials. Where thermally conductive materials are employed, a portion of the heat dissipation member 280 may be in intimate contact with surrounding housing structure.

Figure 9:
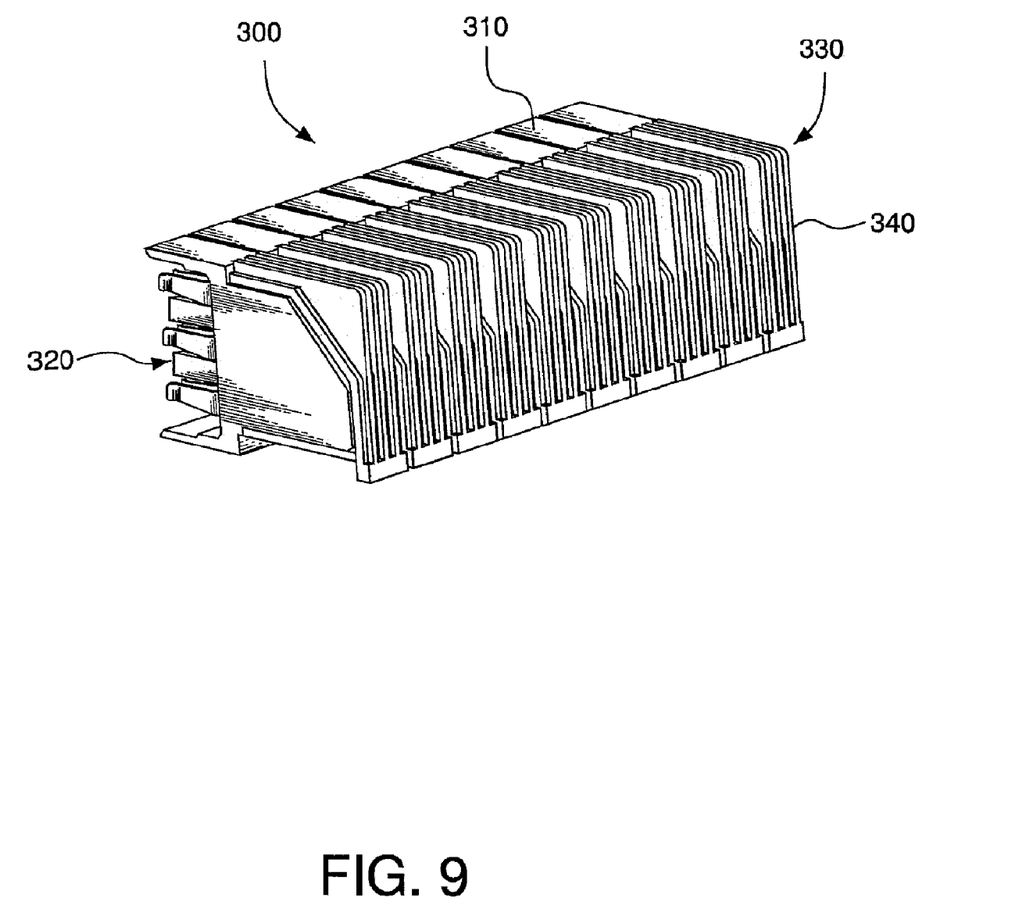
FIG. 9 is a rear perspective view of an electrical connector provided by the present invention.

Depending on the application, more or less heat can be generated from transmission of power through the electrical connectors of the present invention. In a high heat situation, the thermally conductive heat dissipation member can include a considerable amount of surface area, both in contact with the power contact and exposed to an exterior of the connector (i.e., the outside environment). By way of example, and as shown in FIG. 9, a connector 300 is shown including a housing 310, a plurality of power contacts 320 and an equal number of heat dissipation members 330.

Figure 10:
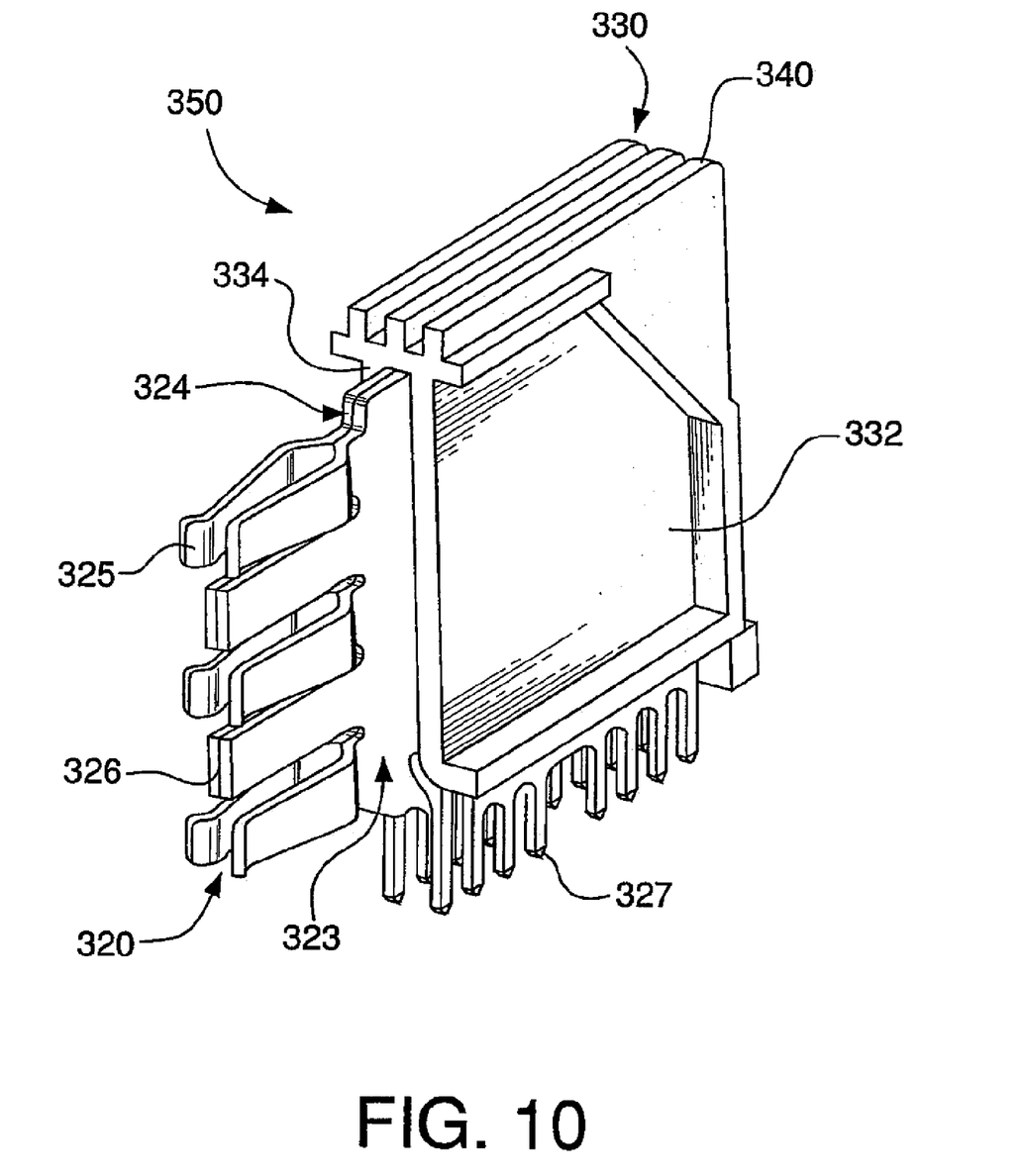
FIG. 10 is a front perspective view of a third preferred power contact and heat dissipation member subassembly.

A subassembly 350 of a power contact 320 and heat dissipation member 330 is shown in FIG. 10. Power contact 320 includes first and second plate-like body members 323, 324, with each having alternating angled 325 and straight 326 cantilevered beams extending from a body member front edge, and a plurality of terminals 327 extending from a body member bottom edge. Heat dissipation member 330 comprises a pair of panels 332 and 334 that are in contact with respective outer portions of body members 323, 324, and multiple fins 340 extending along top and rear portions of the panels. As can be seen in FIG. 9, the connector housing 310 is configured to permit substantial exposure of the fins 340 for efficient convective heat transfer.

In FIGS. 5-10, an individual heat dissipation member engages each power contact. However, a fewer number of heat dissipation members may be employed, so that not every power contact is in engagement with a heat dissipation member. Moreover, a heat dissipation member may be designed to engage more than a single power contact to make manufacturing and assembly more efficient.

Power contacts of the present invention are made from suitable materials, such as, for example, copper alloys. The contacts may be plated with materials such as gold, a combination of gold and nickel, or a range of other materials commonly known within the industry. The number of contacts and their arrangement in connector housings is not limited to that shown in the figures. Preferred power contacts of the present invention comprise plate-like body members. One of ordinary skill in the art would readily appreciate that the plate-like body members may be planar or non-planar in form. The power contacts may contain apertures or other heat transfer features. Similarly, the connector housings may contain heat transfer features not shown in the included figures, such as, for example, heat channels extending from the exterior of the connector to an interior of the housing, voids, or gaps adjacent some portions of the retained power contacts to combine conductive and convective heat transfer. Note that while both the plug and receptacle connectors described above employ thermally conductive materials, alternative embodiments include mating connectors where only one of the plug connector and the receptacle connector employs thermally insulative material.

The description has focused on exemplary power contact and connector embodiments shown in the figures. Variations of such embodiments are included within the spirit of the present invention, the manifestations of some of which is included through the various claims appended hereto.

What is claimed:

1. An electrical connector, comprising:
  a housing comprising a thermally-insulative material;
  a power contact positioned in the housing; and
  a thermally-conductive clip formed from a thermally-conductive thermoplastic and engaging the power contact so that the thermally-conductive clip transfers heat from the power contact.

2. The electrical connector of claim 1, wherein the thermally-conductive clip comprises a first portion exposed to the environment around the electrical connector, and a first panel adjoining the first portion and positioned adjacent a first major surface of the power contact.

3. The electrical connector of claim 2, wherein the thermally-conductive clip further comprises a second panel adjoining the first portion, the second panel being positioned adjacent a second major surface of the power contact.

4. The electrical connector of claim 2, wherein the electrical connector comprises two power contacts and the first panel is positioned between the power contacts.

5. The electrical connector of claim 2, wherein the first panel and the housing define a channel in fluid communication with the environment around the electrical connector whereby heat can be transferred from the power contact to the environment around the electrical connector by conduction and convection.

6. The electrical connector of claim 2, wherein the first portion comprises a plurality of fins.

7. The electrical connector of claim 2, wherein the first portion comprises a plurality of studs.

8. The electrical connector of claim 1, wherein the power contact comprises two plates that define, in combination, both a female mating contact and a male mating contact.

9. The electrical connector of claim 1, wherein the thermally-conductive thermoplastic comprises a polymeric material selected from the group consisting of: nylons; liquid crystal polymers; and polyesters; and a material selected from the group consisting of: graphite carbon fibers; carbon powder; metallic fillers; and ceramic fillers.

10. The electrical connector of claim 2, wherein the electrical connector comprises two power contacts; the thermally-conductive clip further comprises a second panel adjoining the first portion; the first panel contacts a first of the power contacts; and the second panel contacts a second of the power contacts.

11. The electrical connector of claim 2, wherein the first panel transfers heat from the power contact to the first portion by conductive heat transfer, and the first portion transfers heat to the environment around the electrical connector by convective heat transfer.

12. An electrical connector, comprising:
a housing comprising a thermally-insulative material;
a power contact positioned in the housing;
a thermally-conductive member formed from a thermally-conductive thermoplastic and disposed proximal to the power contact so that the thermally-conductive member transfers heat from the power contact; and
at least one of a thermally-conductive gasket and a thermally-conductive compound disposed between the power contact and the thermally-conductive member.

13. The electrical connector of claim 12, wherein the thermally-conductive member comprises a first portion exposed to the environment around the electrical connector, and a first panel adjoining the first portion and positioned adjacent a first surface of the power contact.

14. The electrical connector of claim 13, wherein the electrical connector comprises two power contacts and the first panel is positioned between the power contacts.

15. The electrical connector of claim 13, wherein the electrical connector comprises two power contacts and the first panel is positioned between the power contacts.

16. The electrical connector of claim 13, wherein the first panel and the housing define a channel in fluid communication with the environment around the electrical connector whereby heat can be transferred from the power contact to the environment around the electrical connector by conduction and convection.

17. The electrical connector of claim 13, wherein the first portion comprises a plurality of fins.

18. The electrical connector of claim 13, wherein the first portion comprises a plurality of studs.

19. The electrical connector of claim 13, wherein the power contact comprises two plates that define, in combination, both a female mating contact and a male mating contact.

20. The electrical connector of claim 12, wherein the thermally-conductive thermoplastic comprises a polymeric material selected from the group consisting of: nylons; liquid crystal polymers; and polyesters; and a material selected from the group consisting of: graphite carbon fibers; carbon powder; metallic fillers; and ceramic fillers.

21. The electrical connector of claim 13, wherein the electrical connector comprises two power contacts; the thermally-conductive member further comprises a second panel adjoining the first portion; the first panel contacts a first of the power contacts; and the second panel contacts a second of the power contacts.

22. The electrical connector of claim 13, wherein the first panel transfers heat from the power contact to the first portion by conductive heat transfer, and the first portion transfers heat to the environment around the electrical connector by convective heat transfer.

23. An electrical connector, comprising:
a housing comprising a thermally-insulative material;
a power contact positioned in the housing; and
a thermally-conductive member formed from a thermally-conductive thermoplastic and touching the power contact so that the thermally-conductive member transfers heat from the power contact, wherein the thermally-conductive member includes a first portion exposed to the environment around the electrical connector, and a first panel adjoining the first portion and positioned adjacent a first major surface of the power contact, wherein the first panel and the housing define a channel in fluid communication with the environment around the electrical connector whereby heat can be transferred from the power contact to the environment around the electrical connector by conduction and convection.

24. An electrical connector, comprising:
a housing comprising a thermally-insulative material;
a power contact positioned in the housing; and
a thermally-conductive member formed from a thermally-conductive thermoplastic and comprising a first portion exposed to the environment around the electrical connector, and a first panel adjoining the first portion and positioned adjacent a first major surface of the power contact, wherein the first portion comprises at least one of a fin or a stud.

25. An electrical connector, comprising:
a housing comprising a thermally-insulative material;
a power contact positioned in the housing, the power contact comprising a first body portion and a second body portion, the first body portion having a first internal surface and a first external surface, and the second body portion having a second internal surface facing the first internal surface and a second external surface; and
a thermally-conductive member formed from a thermally-conductive thermoplastic, the thermally-conductive member touching at least one of the first and second external surfaces of the power contact so that the thermally-conductive member transfers heat away from the power contact.

* * * * *

UNITED STATES PATENT AND TRADEMARK OFFICE
CERTIFICATE OF CORRECTION

PATENT NO.        : 7,476,108 B2
APPLICATION NO.   : 11/255295
DATED             : January 13, 2009
INVENTOR(S)       : Swain et al.

It is certified that error appears in the above-identified patent and that said Letters Patent is hereby corrected as shown below:

At COL. 7, (claim 14), lines 30-32: delete entire claim 14 at lines 30-32 and substitute therefor:

--14. The electrical connector of claim 13, wherein the thermally-conductive member further comprises a second panel adjoining the first portion, the second panel being positioned adjacent a second surface of the power contact.--

At COL. 7, (claim 19), line 46, delete "13" and substitute therefor --12-- so that the phrase reads: --The electrical connector of claim 12 . . .--

Signed and Sealed this

Third Day of March, 2009

JOHN DOLL
*Acting Director of the United States Patent and Trademark Office*